United States Patent [19]

Ishikawa et al.

[11] Patent Number: 4,881,428

[45] Date of Patent: Nov. 21, 1989

[54] THROTTLE VALVE CONTROL APPARATUS FOR INTERNAL COMBUSTION ENGINE

[75] Inventors: Yoshikazu Ishikawa; Kouji Yamaguchi; Kouji Sasajima, all of Wako, Japan

[73] Assignee: Honda Giken Kogyo Kabushiki Kaisha, Tokyo, Japan

[21] Appl. No.: 63,398

[22] Filed: Jun. 18, 1987

[30] Foreign Application Priority Data

Jun. 18, 1986 [JP] Japan ................................ 61-143421

[51] Int. Cl.4 ................................................ B60K 41/06

[52] U.S. Cl. ........................................ 74/859; 74/860; 123/361

[58] Field of Search ................. 74/858, 859, 865, 866, 74/872, 874, 860; 364/424.1; 123/361

[56] References Cited

U.S. PATENT DOCUMENTS

| | | | |
|---|---|---|---|
| 2,592,375 | 4/1952 | Ball | 74/859 |
| 4,112,885 | 9/1978 | Iwata et al. | 123/361 X |
| 4,192,202 | 3/1980 | Gospodar et al. | 74/859 |
| 4,290,323 | 9/1981 | Gospodar | 74/872 |
| 4,473,049 | 9/1984 | Jahr | 74/858 X |
| 4,493,228 | 1/1985 | Vukovich et al. | 74/859 X |
| 4,505,169 | 3/1985 | Ganoung | 74/858 |
| 4,531,430 | 7/1985 | Holmes | 74/858 |
| 4,589,302 | 5/1986 | Oda et al. | 74/866 |
| 4,601,271 | 7/1986 | Ejiri et al. | 123/361 |
| 4,691,285 | 9/1987 | Takeda | 364/424.1 |
| 4,691,676 | 9/1987 | Kikuchi | 123/631 X |
| 4,691,677 | 9/1987 | Hotate et al. | 123/361 X |
| 4,698,535 | 10/1987 | Shiraki et al. | 123/361 X |
| 4,718,380 | 1/1988 | Katayose et al. | 123/361 X |
| 4,720,792 | 1/1988 | Kasai et al. | 74/866 |

FOREIGN PATENT DOCUMENTS

| | | | |
|---|---|---|---|
| 3519220 | 12/1985 | Fed. Rep. of Germany | 123/361 |
| 72822 | 11/1979 | Japan | 74/859 |
| 10751 | 1/1984 | Japan | 123/361 |
| 58131 | 4/1984 | Japan | 123/361 |
| 60-164630 | 8/1985 | Japan . | |

*Primary Examiner*—Dwight G. Diehl

*Attorney, Agent, or Firm*—Birch, Stewart, Kolasch & Birch

[57] ABSTRACT

A vehicle engine throttle valve control apparatus whereby the actuation position of an accelerator pedal, the degree of opening of the throttle valve, and the position of the vehicle gear shift are detected. One of a plurality of different throttle valve target opening degree characteristics is then selected which corresponds to the current gear shift position, and the selected characteristic is used to set a target degree of opening for the throttle valve in accordance with the accelerator pedal position. The throttle valve is driven so as to make the actual degree of throttle opening become equal to the target value. Appropriate throttle control is thereby automatically performed each time a gear shift operation is executed, without intervention by the vehicle driver.

4 Claims, 4 Drawing Sheets

THROTTLE VALVE CONTROL APPARATUS FOR INTERNAL COMBUSTION ENGINE

BACKGROUND OF THE INVENTION

1. Field of the Invention

The present invention relates to a throttle valve control apparatus for an internal combustion engine, whereby the degree of opening of the engine throttle valve is controlled in accordance with the accelerator pedal's actuation.

2. Description of Background Information

A conventional throttle valve control apparatus for an internal combustion engine uses the detection of the actuation position of the engine accelerator pedal to drive and the throttle valve is driven to a degree of opening which is in accordance with the relationship between the detected pedal actuation position and a predetermined throttle valve opening degree characteristic. An example of this device is described Japanese Patent Laid-open No. 60-164630.

When a shift-up operation of a vehicle's transmission driven by an internal combustion engine is executed, i.e., a shift from a low gear to a higher gear, it is necessary to close the throttle valve by an amount corresponding to a lowering of the engine's speed of rotation that results from the shift-up operation. If this is not done, then the throttle valve will be in an excessively open condition following the shift operation, whereby the amount of pollutants in the engine exhaust gas will be increased. Similarly, when a shift-down operation of the transmission is executed, it is necessary to open the throttle valve by an amount corresponding to the increase of engine speed that results from the shift operation. If this is not done, then the throttle valve will be in an excessively closed condition following the shift operation, which will result in poor engine response.

SUMMARY OF THE INVENTION

It is an objective of the present invention to provide a throttle valve control apparatus whereby when a gear shift operation of the vehicle transmission is performed, increased exhaust gas pollutant emission is prevented and enhanced engine response is achieved, without the necessity for driver of the vehicle to change the accelerator pedal actuation position.

With a throttle valve control apparatus for a vehicle engine according to the present invention, a plurality of respectively different target opening degree characteristics are utilized, which are respectively selected for use in accordance with the corresponding shift position of the vehicle transmission, as detected by shift position detection means. Each of these target opening degree characteristics represents a relationship between the target degrees of opening of the engine throttle valve and the position of the accelerator pedal's actuation. An appropriate characteristic (selected in accordance with the current gear shift position) is used to establish a target degree of opening of the throttle valve in accordance with the accelerator pedal actuation position, and the throttle valve is driven to reduce the amount of deviation between the actual throttle valve degree of opening (detected by a throttle valve opening degree sensor) and the above-mentioned target degree of opening. In this way, the actual throttle degree of opening is made equal to the target value.

More specifically, the present invention comprises a control apparatus for a throttle valve disposed in an intake system of an internal combustion engine mounted in a vehicle, for controlling a degree of opening of the throttle valve; accelerator actuation detection means for producing an output representative of an actuation position of an accelerator pedal; setting means for setting a target degree of opening of the throttle valve in accordance with the actuation position of the accelerator pedal detected by the accelerator actuation detection means; throttle valve opening degree detection means for producing an output representative of an actual degree of opening of the throttle valve; drive means for driving the throttle valve in a direction such as to reduce an amount of deviation between the actual degree of opening of the throttle valve and the target degree of opening; and shift position detection means for detecting a current shift position among a plurality of gear shift positions of a vehicle transmission which is coupled to the internal combustion engine, wherein the setting means selects from a plurality of respectively different throttle valve target opening degree characteristics one of which corresponds to the detected shift position, and utilizes the selected characteristic for setting a target degree of opening of the throttle valve in accordance with the current accelerator pedal actuation position.

DESCRIPTION OF EMBODIMENTS

Figure 1:
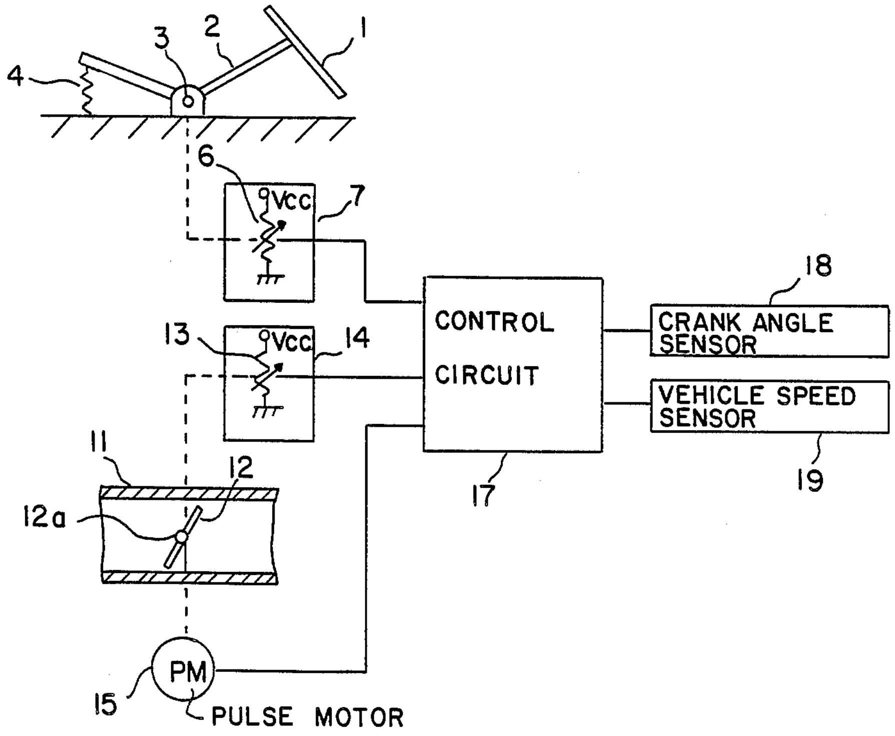
FIG. 1 is a general diagram to illustrate an embodiment of the present invention.

The present invention will be described referring to FIG. 1, which shows an embodiment of a throttle valve control apparatus according to the present invention for an internal combustion engine which drives a motor vehicle. An accelerator pedal 1 is coupled to one end of an angle bracket 2 which is rotatably mounted on the floor of a vehicle by a shaft 3. A return spring 4 is coupled to the other end of bracket 2 and pushes the accelerator pedal 1 upwards to an idling position. An accelerator actuation position sensor 7 consisting of a potentiometer 6 is coupled to the shaft 3, and produces an output voltage in accordance with the actuation position of the accelerator pedal 1, i.e. in accordance with the accelerator angle. This angle is defined as the angle through which its shaft 3 has rotated about the axis from the idling position of the accelerator pedal 1.

A throttle valve opening degree sensor 14 consists of a potentiometer 13 which is coupled to a shaft 12*a* of throttle valve 12, mounted in the engine intake pipe 11, and which generates an output voltage in accordance with the degree of opening of throttle valve 12. The shaft 12*a* is also coupled to the drive shaft of a pulse motor 15.

The sensors 7 and 14 and the motor 15 are connected to a control circuit 17. Also connected to the control circuit 17 are a crank angle sensor 18 which produces pulses in accordance with rotation of the engine crank-shaft (not shown in the drawings), and a vehicle speed sensor 19 which produces an output that varies in accordance with vehicle speed.

Figure 2:
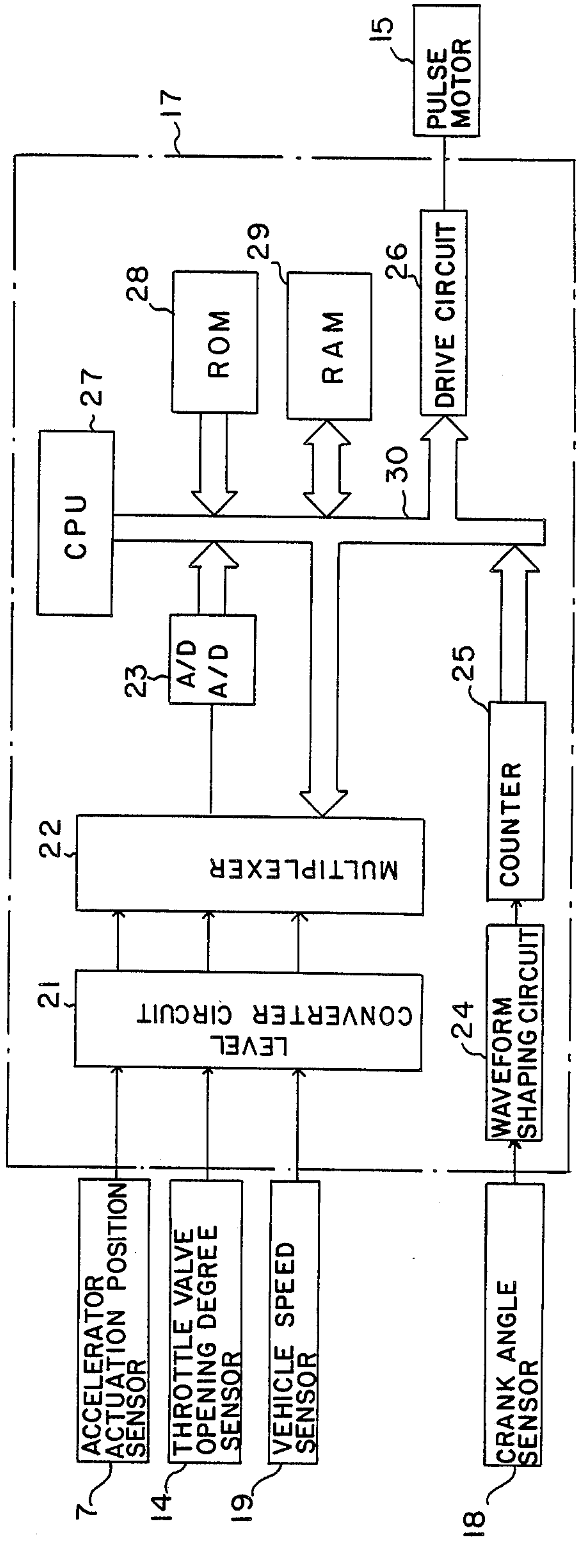
FIG. 2 is a circuit diagram of a specific example of a control circuit used in the embodiment of FIG. 1.

As shown in FIG. 2, the control circuit 17 contains a level converter circuit 21 which performs level conversion of the outputs from the accelerator actuation position sensor 7, the throttle valve opening degree sensor 14, and the vehicle speed sensor 19. Control circuit 17 also includes a multiplexer 22 which receives the level-converted output voltages from level converter circuit 21 and selects one of these to be produced as output, an A/D converter 23 which performs analog-digital conversion of the selected output voltage from multiplexer 22, a waveform shaping circuit 24 which performs waveform shaping of the output signal from crank angle sensor 18, a counter 25 which counts a number of clock pulses that are produced from a clock pulse generating circuit (not shown in the drawings) during each interval between generation of successive TDC (Top Dead Center) signal pulses produced as output from waveform shaping circuit 24, a drive circuit 26 which drives the pulse motor 15, a CPU (Central Processing Unit) 27 which performs digital operations in accordance with a program, a ROM (Read-only Memory) 28 in which programs and data have stored, prior to operation of the throttle control apparatus, and a RAM (Random Access Memory) 29. The multiplexer 22, A/D converter 23, counter 25, drive circuit 26, CPU 27, ROM 28 and RAM 29 are mutually interconnected by a bus 30. CPU 27 also receives clock pulses from a clock pulse generating circuit (not shown in the drawings).

The operation of the embodiment is as follows. Respective data for an accelerator angle $\theta_{ACC}$, a throttle valve degree of opening $\theta_{th}$, and a vehicle speed V supplied from A/D converter 23 are selectively transferred to the CPU 27 over the bus 30. In addition, data representing the engine speed of rotation $N_e$ from the counter 25 are supplied to CPU 27 over bus 30. CPU 27 reads the respective data in accordance with a processing program which is stiored in the ROM 28, with the reading being performed in synchronism with the clock pulses. CPU 27 thereby performs processing as described below for generating commands which are supplied to the drive circuit 26 to drive the pulse motor 15. These commands consists of pulse motor valve-opening drive commands, pulse motor valve-closing drive commands, and pulse motor drive halt commands (whereby the driving of pulse motor 15 is halted).

Figure 3:
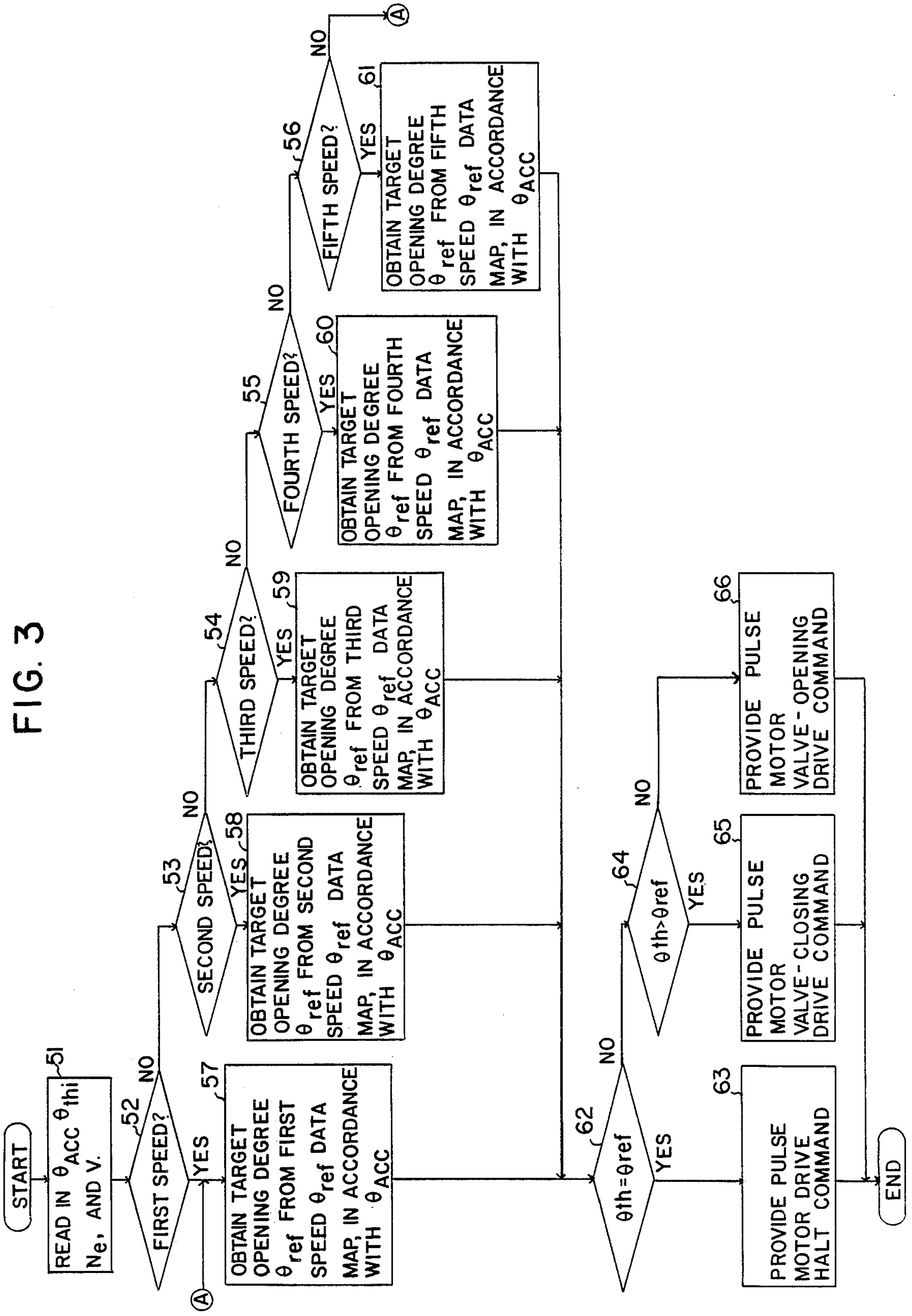
FIG. 3 is a flow chart showing a subroutine performed a CPU shown in FIG. 2.
Figure 4:
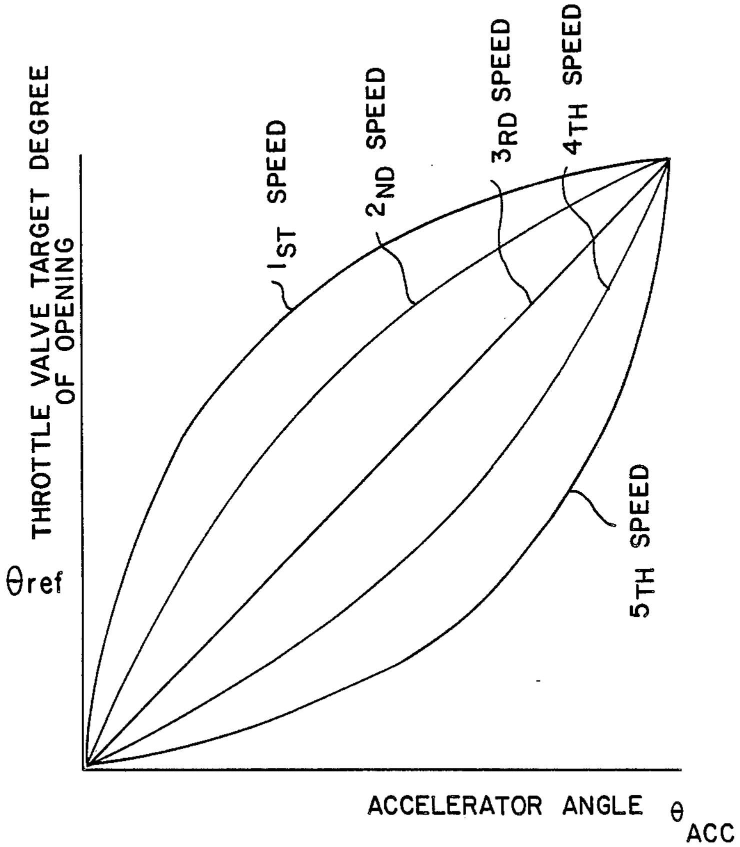
FIG. 4 shows accelerator angle $\theta_{ACC}$-throttle valve target opening degree characteristics for each of the shift positions.

The operation of the throttle valve control apparatus according to the present invention will now be described with reference to the subroutine performed in the CPU 27 which is shown in FIG. 3.

CPU 27 executes the following sequence of operations, at predetermined periodic intervals. First, the accelerator angle $\theta_{ACC}$, the throttle valve degree of opening $\theta_{th}$, the vehicle speed V, the engine speed of rotation $N_e$, are respectively read. In this embodiment, a manually operated speed change gear (not shown in the drawings) having five forward speeds is utilized. Decisions are then made as to whether or not the speed change gear is set in each of the first through fifth speed positions respectively (steps 52 through 56). Each of these decisions as to the gear shift position is made by judging the ratio of vehicle speed V to the engine speed of rotation $N_e$. The ROM 28 has a set of first speed to fifth speed $\theta_{ref}$ data maps stored in it beforehand, (where "data map" has the significance of a memory-mapped relationship between accelerator angle and degree of throttle valve opening). These data maps represent different accelerator angle $\theta_{ACC}$-throttle valve target degree of opening characteristics, which are selected for use in accordance with the respective gear shift positions. For example, if the speed change gear is set to the first speed position, then the first speed data map is selected, and the target degree of opening $\theta_{ref}$ is determined from this data map in accordance with the accelerator angle $\theta_{ACC}$ (step 57). Similarly, the target degree of opening $\theta_{ref}$ of throttle valve 12 is determined for each of the first through the fifth speeds in accordance with the accelerator angle $\theta_{ACC}$, from the corresponding $\theta_{ref}$ data map (steps 58 through 61). After obtaining the target degree of opening $\theta_{ref}$ in this way, a decision is made as to whether or not the throttle valve degree of opening $\theta_{th}$ which has been read is identical to the target degree of opening $\theta_{ref}$ (step 62). If $\theta_{th}=\theta_{ref}$, a pulse motor drive halt command is provided to the drive circuit 26 (step 63). If $\theta_{th}\neq\theta_{ref}$, a decision is made as to whether or not the throttle valve degree of opening $\theta_{th}$ is greater than the target degree of opening $\theta_{ref}$ (step 64). If $\theta_{th}>\theta_{ref}$, then a pulse motor throttle valve-closing drive command is provided to the drive circuit 26, to drive the throttle valve in the closing direction (step 65). If $\theta_{th}$ is not greater than $\theta_{ref}$, i.e. $\theta_{th}<\theta_{ref}$, a pulse motor throttle valve-opening drive command is provided to the drive circuit 26, to drive the throttle valve in the opening direction (step 66).

If it is found that the speed change gear is not set to any of the five forward speed positions which normally indicates that the gear shift is in the neutral or reverse position, the target degree of opening $\theta_{ref}$ of throttle valve 12 is obtained in accordance with the accelerator angle $\theta_{ACC}$ from the first speed $\theta_{ref}$ data map, in the same way if the gear shift was found to be in the first speed position.

The drive circuit 26 responds to a pulse motor valve-opening drive command to cause forward rotation of pulse motor 15, thereby driving the throttle valve 12 in the opening direction, and responds to a pulse motor valve-closing drive command to cause reverse rotation of pulse motor 15, thereby driving the throttle valve 12 in the closing direction. Furthermore, in response to a pulse motor drive halt command, drive circuit 26 acts to halt the rotation of pulse motor 15, thereby maintaining the current degree of throttle valve opening.

Figure 5:
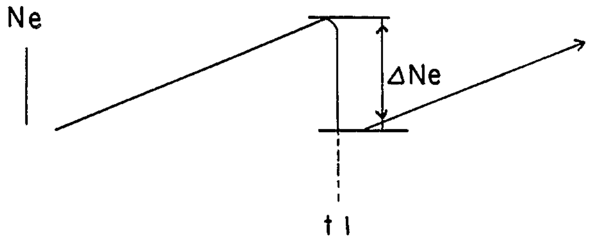
FIG. 5 shows variations of engine speed of rotation which occur when shift-up operations are executed.

In this way, different accelerator angle-throttle valve target degree of opening characteristics are selected in accordance with the position of the gear shift and utilized to obtain the target degree of opening $\theta_{ref}$, and the throttle valve 12 is driven to a degree of opening which is identical to this target degree of opening $\theta_{ref}$. When a shift-up operation of the gears is performed, as shown in FIG. 5 the engine speed of rotation $N_e$ will be lowered at a time $t_1$, i.e. when clutch engagement occurs following the gear shift. The throttle valve is, therefore, closed by an amount which is in accordance with the predicted extent $\Delta N_e$ of this reduction of engine speed, by selecting a different one of the accelerator pedal-throttle valve target degree of opening characteristics from which a new target degree of opening is obtained. The appropriate amount of closing of the throttle valve is thereby executed without any change in the accelerator angle, i.e., without any change in the accelerator pedal actuation position. Similarly when a shift-down operation of the speed change gear is performed, the engine speed of rotation $N_e$ will be increased when the clutch is engaged after the gear shift is executed. The throttle valve is therefore open by an amount which corresponds to the predicted extent $\Delta N_e$ of the increase in the engine speed, again by selecting a different one of the accelerator pedal-throttle valve target degree of opening characteristics, corresponding to the new gear shift position, and obtaining a new value of throttle valve target degree of opening by utilizing that characteristic, without a change in the accelerator angle. The accelerator angle-throttle valve target degree of opening characteristic for the first speed position of the gears can be considered a reference characteristic, with other characteristics being respectively selected each time a gear shift is executed.

In the embodiment of the present invention described above, the shift position of the gear is judged on the basis of the ratio between the vehicle speed V and engine speed of rotaion $N_e$. However it would be equally possible to detect the shift positions by means such as switches coupled to the shift lever.

Furthermore, with a throttle valve control apparatus according to the present invention as described above, a target degree of opening of the throttle valve is established in accordance with the accelerator pedal actuation position by using a target opening degree characteristic of the throttle valve. The target opening degree characteristic is selected in accordance with the current position of the vehicle transmission detected by shift position detection means from among a set of different target opening degree characteristics respectively corresponding to each of the gear shift positions. As a result, when a shift-down or shift-up operation of the transmission is executed, a target degree of opening of the throttle valve is immediately obtained from an appropriate target opening degree characteristic which corresponds to the new gear shift position. Thus, the throttle valve is thereby controlled to open or close by an amount which corresponds to the amount of change in the engine speed of rotation that is produced by the gear shift operation. In this way, increased emission of exhaust gas pollutants following a gear shift operation can be prevented, while improved driving response is attained.

Furthermore in the case of an automatic transmission, the invention enables a reduction in the amount of impact that is produced when a shift-up operation is executed, by suitably controlling the throttle valve to close by an appropriate amount.

What is claimed is:

1. A control apparatus for a throttle valve disposed in an intake system of an internal combustion engine, for controlling a degree of opening of said throttle valve, comprising:
   - accelerator actuation detection means for producing an output representing a current actuation position of an accelerator pedal;
   - setting means, responsive to said accelerator actuation detection means, for setting a target degree of opening for said throttle valve according with said current actuation position of said accelerator pedal detected by said accelerator actuation detection means;
   - throttle valve opening degree detection means, operatively connected to said throttle valve, for producing an output representing an actual degree of opening for said throttle valve;
   - drive means, responsive to said setting means and said throttle valve opening degree detection means, for driving said throttle valve in a direction to reduce an amount of deviation between said actual degree of opening for said throttle valve and said target degree of opening; and
   - shift position detection means for detecting a current shift position among a plurality of shift positions of a vehicle's transmission which is coupled to said internal combustion engine; wherein said setting means selecting, from a plurality of different throttle valve target opening degree characteristics corresponding to accelerator pedal actuation positions, a characteristic corresponding to the detected shift position and utilizing the selected characteristic for setting said target degree of opening of said throttle valve in accordance with said current accelerator pedal actuation position.

2. The throttle valve control apparatus as claimed in claim 1, wherein when a shift-up operation is detected by said shift position detection means, said driving means closes said throttle valve by an amount in accordance with a predicted amount of change in the engine's speed of rotation, said predicted amount being between a speed immediately prior to said shift-up operation and a speed immediately following said shift-up operation; and wherein
   - when a shift-down operation is detected, said driving means opens said throttle valve by an amount in accordance with a predicted amount of change in the engine's speed of rotation, said predicted amount being between a speed immediately prior to said shift-down operation and a speed immediately following said shift-down operation.

3. A control apparatus for a throttle valve disposed in an intake system of an internal combustion engine, for controlling a degree of opening for the throttle valve, comprising:
   - accelerator detection means for producing a signal representing a current position of an accelerator pedal;
   - setting means, responsive to said accelerator detection means, for establishing a target degree of opening for said throttle valve;
   - throttle valve detection means, operatively connected to said throttle valve, for producing a signal representing an actual degree of opening for said throttle valve;
   - correcting means, responsive to said setting means and said throttle valve detection means, for driving said throttle valve in a direction to reduce amount of deviation between said actual degree of opening and said target degree of opening; and
   - shift detection means, operatively connected to said setting means, for detecting a current shift position of the vehicle's transmission;
   - said setting means, responsive to said shift detection means, selecting a characteristic degree of opening corresponding to the detected shift position, said characteristic degree of opening being selected in accordance with said current position of the accelerator pedal;
   - said correcting means, responsive to said characteristic degree of opening, driving said throttle valve in a direction to substantially eliminate an amount deviation between said characteristic degree of opening and said actual degree of opening, thereby substantially preventing an increase in emissions of exhaust gas pollutants during a shift operation.

4. The control apparatus as claimed in claim 3, wherein when an up-shift operation is detected by said shift detection means, said correcting means closes said throttle valve by an amount according to a predicted amount of change in the engine's speed of rotation during said up-shift operation; and wherein when down-shift operation is detected, said correcting means opens said throttle valve by an amount according to a predicted amount of change in the engine's speed of rotation during said down-shift operation.

* * * * *